United States Patent [19]

Briechle

[11] Patent Number: 5,704,049
[45] Date of Patent: Dec. 30, 1997

[54] SUBGLOBAL AREA ADDRESSING FOR ELECTRONIC PRICE DISPLAYS

[75] Inventor: George T. Briechle, New Canaan, Conn.

[73] Assignee: Electronic Retailing Systems International Inc., Wilton, Conn.

[21] Appl. No.: 247,334

[22] Filed: May 23, 1994

Related U.S. Application Data

[63] Continuation-in-part of Ser. No. 995,048, Dec. 22, 1992.

[51] Int. Cl.⁶ .................................................. G06F 15/16
[52] U.S. Cl. .................................... 395/326; 364/403
[58] Field of Search ............................. 364/403, 404, 364/405; 395/100, 155, 161

[56] References Cited

U.S. PATENT DOCUMENTS

| | | | |
|---|---|---|---|
| 4,002,886 | 1/1977 | Sundelin | 235/383 |
| 4,346,453 | 8/1982 | Drapeau et al. | 395/800 |
| 4,500,880 | 2/1985 | Gomersall et al. | 340/825.35 |
| 4,783,740 | 11/1988 | Ishizawa et al. | 364/403 |
| 4,821,291 | 4/1989 | Stevens et al. | 375/259 |
| 4,888,709 | 12/1989 | Revesz et al. | 395/114 |
| 4,962,466 | 10/1990 | Revesz et al. | 395/153 |
| 5,019,811 | 5/1991 | Olsson et al. | 340/825.17 |
| 5,111,196 | 5/1992 | Hunt | 340/825.35 |
| 5,172,314 | 12/1992 | Poland et al. | 364/401 |
| 5,198,644 | 3/1993 | Pfieffer et al. | 235/383 |
| 5,204,821 | 4/1993 | Inui et al. | 364/403 |
| 5,241,467 | 8/1993 | Failing et al. | 364/401 |
| 5,245,534 | 9/1993 | Waterhouse et al. | 364/404 |
| 5,335,171 | 8/1994 | Fuyama | 364/405 |
| 5,348,485 | 9/1994 | Briechle et al. | 364/403 |

FOREIGN PATENT DOCUMENTS

| | | |
|---|---|---|
| 299355 | 1/1989 | European Pat. Off. |
| 9305456 | 3/1993 | WIPO |
| 9305475 | 3/1993 | WIPO |

*Primary Examiner*—Phu K. Nguyen
*Assistant Examiner*—Cliff N. Vo
*Attorney, Agent, or Firm*—Oppedahl & Larson

[57] ABSTRACT

An electronic price display system has uniquely addressed electronic shelf labels (ESLs) controlled by a central computer or host. To save power and communications channel bandwidth, subglobal addressing is defined which permits the central computer to address more than one but less than all of the labels. In one application of the addressing protocol the central computer causes the subglobally addressed labels to perform some common action such as changing a display to an alternative display. In another application of the addressing protocol the central computer uses the subglobal addressing to disambiguate when data collisions occur due to more than one label attempting to respond to a global query.

48 Claims, 8 Drawing Sheets

CHANGING A SECTION

| | PRIOR ART | | SECTION SUBGLOBAL ADDRESSING | | RAIL SUBGLOBAL ADDRESSING | |
|---|---|---|---|---|---|---|
| | COL. A HOST ACTIONS | COL. B LABEL ACTIONS | COL. C HOST ACTIONS | COL. D LABEL ACTIONS | COL. E HOST ACTIONS | COL. F LABEL ACTIONS |
| ROW 1 SETTING UP | FIGURE OUT WHICH LABELS ARE IN A SECTION | NONE | TELL EACH LABEL WHICH SECTION IT IS IN | RECEPTION OF ALL MESSAGES | LABELS TO RECEIVE RAIL IDS | RECEPTION OF ALL MESSAGES |
| | | | PRELOAD LABELS IN SECTION | RECEPTION OF MESSAGES (≈200) | FIGURE OUT WHICH RAILS ARE IN A SECTION | NONE |
| | | | | | PRELOAD LABELS | MESSAGES |
| ROW 2 CHANGE ALL LABELS IN SECTION TO ALTERNATIVE DISPLAY | SEND MESSAGES, ONE FOR EACH LABEL | RECEPTION OF ALL MESSAGES (≈200) | SEND ONE SECTION SUBGLOBAL MESSAGE SPECIFIC TO SECTION | ONE RECEPTION | SEND RAIL SUBGLOBAL MESSAGES EQUATING TO SECTION | ≈10 RECEPTIONS |
| ROW 3 CHANGE THEM ALL BACK | SEND MESSAGES, ONE FOR EACH LABEL | RECEPTION OF ALL MESSAGES (≈200) | SEND ONE MESSAGE | ONE RECEPTION | SEND RAIL MESSAGES | ≈10 RECEPTIONS |

SUBGLOBAL AREA ADDRESSING FOR ELECTRONIC PRICE DISPLAYS

This is a continuation-in-part of U.S. application Ser. No. 07/995,048, filed Dec. 22, 1992, entitled Technique for communicating with electronic labels in an electronic price display system.

BACKGROUND

The invention relates generally to electronic displays that are addressable by a central computer or host, and relates more specifically to such systems used to display prices in retail stores under circumstances where subglobal addressing is employed both to increase the effective communications channel bandwidth and to resolve collisions when more than one electronic display attempts to respond.

Numerous experimenters have attempted to implement systems for the electronic display of prices in stores. The general concept is old and yet has not until recently been commercially viable due to numerous recent advances in the system design. That the general concept is quite old may be seen, for example, in U.S. Pat. No. 4,002,886 to Sundelin, U.S. Pat. No. 4,500,880 to Gomersall and U.S. Pat. No. 5,198,644 to Pfieffer, all of which show electronic price displays which are in communication with a central computer and which change their displayed information based on messages sent by the central computer. None of those prior art systems has been commercially successful, however.

In one commercially viable electronic shelf label (ESL) system there are typically 15,000 or more individually addressable labels. These ESLs are situated in areas according to the organization of the store.

Specifically, the ESLs are along a shelf edge, and in some systems are mounted on a rail. Normally several shelves are associated vertically in a vertical bay. Several vertical bays may be logically associated as a section or category, and several sections may be positioned in a half-aisle. Application Ser. No. 07/757,260 to Failing et. al. (now U.S. Pat. No. 5,241,467), U.S. Pat. No. 5,172,314 to Poland et al., and U.S. Pat. No. 5,245,534 to Waterhouse et. al., all assigned to the same assignee as the present invention and incorporated herein by reference, describe means and methods to collect, maintain, and use location information on each ESL and the product it represents. This information is then used to cause all ESLs in an area or sub-area to change their displays in response to a user request initiated by a hand held unit, a special purpose module, an initiator, or a display function switch. (The user request may be initiated by any of several means including those set forth in U.S. application Ser. No. 07/757,675 for System for Recognizing Display Devices, incorporated herein by reference.) In the current art, multiple messages must be prepared and sent, one each to each ESL in the desired area, to effect the desired display change. In a dense area, such as Health And Beauty Aids (HABA), the time necessary to address all the ESLs in a section or several adjacent vertical bays may take several tens of seconds, which is too long to allow for efficient in-aisle inter-activity with ESL-displayed store maintenance information, such as Computer-Aided Ordering (CAO), shelf or space management, inventory management, or promotional or merchandising information. In addition, for a power-limited system, such as an RF or IR system powered by solar cells or batteries, it is desirable to minimize the number of transmissions from each ESL and, more importantly, to minimize the receiver-on time in order to conserve power and extend battery life.

Global commands may be used to cause an entire set of ESLs to respond at once to the same message. With a system that has the capability to track the geographic location of ESLs (and their related products), whether determined by the system itself such as with appending locator modules or by a separate RF means, or whether simply tracked by manual audit means and maintained in the host computer data base, it is desirable to cause ESLs within a selected geographic region to display different information. Current systems may issue global commands, such as to one gondola controller, and command an entire half-aisle to respond to a command. Alternatively, each individual ESL in an area may be individually addressed, a process that might be acceptable in lightly populated or small areas. However, when the number of ESLs in the selected area is large (on the order of 100 to 200 ESLs), the update time may take 10 to 20 seconds. The estimate of 10 to 20 seconds assumes a typical processor clock rate, but it should be appreciated that the update time is a direct tradeoff with the processor clock rate, which in turn is directly related to the power consumption. In a wired system, as mentioned above, power consumption is not necessarily of grave concern. But in a wireless system (at least one using CMOS processors) it is desirable to reduce power consumption and thus to run the processors as slowly as possible; thus limits the bandwidth of the communications channel since the processor's ability to frame incoming serial data of a given baud rate is limited by its clock speed. If several updates are required as different management modes are exercised (i.e., CAO, space management, etc.), or several layers of information are required to be successively displayed, even though previously stored in the ESL, repeated periods of delay awaiting the ESL update results in inefficient usage of the store personnel labor hours. As the size of the area requiring update increases, such as a section or category, the time delays would become prohibitive.

SUMMARY OF THE INVENTION

In the system according to the invention, the host computer maintains geographic location records for all ESLs, rails, verticals, sections, and half-aisles, associating the logical location of each product with the complete physical address. One method of sub-global addressing is to transfer to each ESL, in specific (preferably) non-volatile registers, the identification of the ESL's rail (rail ID), vertical location, section or category, and gondola controller side (half-aisle). One method of doing this is to allocate 16 bits for the rail ID, 8–12 bits for specifying the vertical grouping, 8 bits for a section ID, and 6–8 bits for to identify the half-aisle. Other allocations might be required for different system applications. When a subglobal global command is issued, the subglobal command would direct a conditional action in all ESLs satisfying the condition, which in this case would be a match between the transmitted subglobal address (desired location, i.e., half-aisle, section, vertical, or rail) and the stored subglobal address (actual ESL location).

The desired action is an enhancement of any of several prior-art possibilities, among them a Modify Sequence Command, Modify Display, Write Display Register N, Write Display Sequence N, or any other new or existing appropriate command. All ESLs satisfying the condition would execute the command.

A pure RF or IR system that features direct communication (i.e. not mediated by a wiring that interconnects rails), the rail ID would be replaced with a shelf ID. For peg hook or other individually installed areas, a null address might be employed in which case additional storage bits might be required. Additional manual maintenance might also be required to maintain the host database.

One aspect of subglobal addressing is that the ESLs have to "learn" their respective subglobal addresses. In the case of a rail ID a simple, preferable, scheme for a rail based system is for the ESL to "learn" the ID of its own rail and store this ID automatically. This may be accomplished by modifying the ESL code to listen to the data bus immediately after transmitting its response (to an addressed message) for the locator module to append its location ID. Self-learning ESLs greatly simplify the host computer requirements, obviating the need to tell each ESL its unique location (half-aisle, section, vertical, and rail), a multiple of messages that must be repeatedly sent to keep the ESLs accurate. In this manner, an ESL is automatically updated when mounted in a new area, just as the host would also update its database when receiving the new appended location code following a response from the moved ESL.

Sub-global area addressing in this approach would be on a rail basis. Vertical bay display or function changes would require multiple sub-global messages to each rail in the desired area. However, even at 100 msec per message, a vertical could be changed in less than 1 second, and several verticals comprising a section could be updated in 2–3 seconds, a reasonable time for the application. The ease of system maintenance allowed by self-locating ESLs more than offsets the need for multiple messages to accomplish the sub-global area addressing when dealing with vertical bays and sections. No change in timing is required for half-aisles (in most installations) or rails, since unconditional global messages may be sent for a half-aisle (these ESLs share a common bus), and only one message is required for a rail in any case.

Conditions other than area may benefit from sub-global, or conditional global messaging. For example, global conditional commands could be sent conditioned on other data stored in the ESL, such as merchandising or promotional state, merchandising port state, or ESL ID. If LEDs, or some other promotional annunciator, were implemented in the ESL, then all ESLs featuring a particular promotion could be turned off while not affecting another group of ESLs using the same LED or annunciator but identified with a different promotional code. Although in a wired, rail-based system, multiple individually addressed messages could accomplish the same result within the available bandwidth and within a reasonable time (background might be acceptable), an RF or IR self-powered (solar cells, batteries) system has a power limitation, and a single sub-global message would significantly reduce the receiver on time, conserving power and battery life.

An important use for sub-global conditional addressing, especially in an RF or IR system, is searching for lost or problem ESLs. This is particularly true when multiple ESLs are responding simultaneously, rendering both (or all) messages unintelligible. This situation might be unintended (a failed ESL responding to all messages) or intentional (a conditional message requesting a response from all ESLs meeting some criterion, such as "all ESLs who have not been addressed in the last bedcheck").

The system would request an identifying (or other) response from all ESLs based upon an address match, using subsets of the ID space. For example, a binary search could be conducted using the least significant nybble of the address space (e.g. 4 bits) as the matching condition for the response. Sixteen messages would cover the entire set of possibilities. If this first search did not resolve the collision, the next significant nybble would be used as the conditional match, and other nybbles in turn until the collision was resolved.

In a broader application of sub-global conditional addressing, commands could be executed for any combination of internal states, such as Agreement Bit Set, Address Nybble N, no addressed message received (not being bed checked), etc., or combinations as required.

DESCRIPTION OF THE DRAWING

The invention will be described with respect to a drawing, of which.

DETAILED DESCRIPTION OF EXEMPLARY EMBODIMENTS

Figure 1:
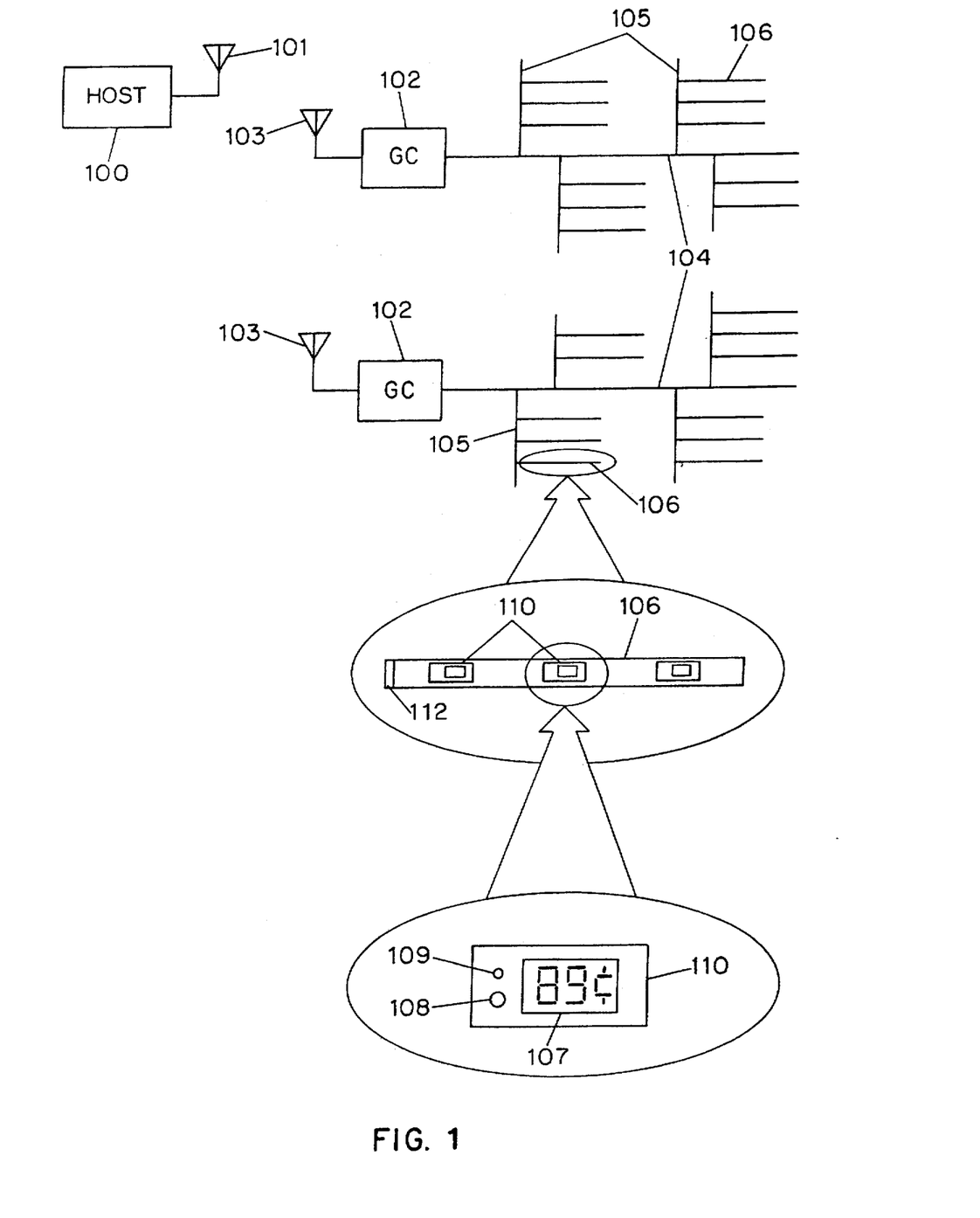
FIG. 1 shows a communications topology for a system according to the invention.

The description of the system according to the invention begins with FIG. 1, which shows a communications topology. A host 100 is typically a microcomputer or, less preferably, is a portion of some microcomputer that also accomplishes other tasks. The host 100 includes a processor, hard disk drive, screen, keyboard, and interface hardware to interface with antenna 101.

Following the information propagation from host outwards, antennas 103 may be seen which are linked to gondola controllers 102. Each gondola controller 102 is preferably associated with one gondola of a grocery store. Thus, if a store has six aisles, the number of gondola controllers may be approximately seven, one for each of the free-standing gondolas and one for each wall bearing shelves. Antennas 101, 103 preferably comprise portions of a local-area wireless network system operating in UHF spectrum such as a 900-MHz band.

Each gondola is linked to a gondola backbone 104 which runs the length of the gondola and preferably along the top thereof. The backbone 104 is preferably a serial line such as that of U.S. application Ser. No. 08/045,910, entitled Electronic price display system with vertical rail, now U.S. Pat. No. 5,348,485, incorporated herein by reference. Descending from backbone 104 are vertical rails 105, preferably of the type shown in the just-mentioned application Ser. No. 08/045,910. Finally, along the front of each shelf is a shelf rail 106 which is connected to a nearby vertical rail. The shelf rail 106 is preferably that shown in U.S. application Ser. No. 08/036,950, entitled Information Display Rail System, incorporated herein by reference.

Other aspects of system design are set forth in U.S. application Ser. No. 08/008,200 entitled Electronic price display system with data bus isolation now abandoned; application Ser. No. 08/114,510 entitled Space Management System; and application Ser. No. 08/155,723 entitled Electronic Shelf Label Location System now abandoned; all of which are hereby incorporated by reference.

FIG. 1 also shows a magnified view of the shelf rail 106. In the magnified view one may see not only the rail 106 but also electronic shelf labels (ESLs or labels) 110, and also an end cap 112, about which more will be said later.

FIG. 1 also shows a magnified view of the label 110. In the magnified view one may see a pushbutton 108, a light-emitting diode (LED) 109, and a liquid-crystal display 107 which typically shows a price.

The system of FIG. 1 is preferably defined to have protocols by which the host 100 and labels 110 exchange information. Central to the enterprise is that the host 100 communicates prices to the labels 110, which prices are displayed so that consumers may see them. Linking the host 100 to the system of cash registers and price scanners at the store checkout counters permits having a high degree of confidence that the price charged at the checkout is the same as the price that appeared when the consumer selected the merchandise. The protocol employed in communication between host 100 and labels 110 may be based upon that set forth in U.S. application Ser. No. 07/995,048, filed Dec. 22, 1992, entitled Technique for communicating with electronic labels in an electronic price display system, which is incorporated herein by reference.

FIG. 1 assumes that all of the connections between the gondola controllers and labels are hard-wired, namely through backbone 104 and rails 105 and 106. This wiring provides not only a bidirectional data communications channel but also power for all the labels 110. The power is distributed from the gondola controllers 102, which are in turn powered by AC power and contain backup power supplies such as lead-acid, nickel-cadmium or nickel-metal-hydride cells. In the system of FIG. 1 there is little need for the system designer to worry overly much about the power consumption in individual labels 110 since quite a lot of power is available from the AC power line. In the system of FIG. 1 one of the sources of performance limitations is the non-infinite bandwidth of the bidirectional data channel. As will be discussed below, the subglobal addressing techniques of the invention overcome many of the performance limitations of the communications channel.

One aspect of system design is that it is important to know where a particular label 110 is located. To this end, the communications channel of the rails 106 is set up so that identifier integrated circuits (ID chips) in the end caps 112 make it possible for the host 100 to know which rail 106 happens to contain a particular label 110. As set forth in U.S. Pat. No. 5,245,534, incorporated herein by reference, the host 100 may send a message to a label 110 asking it to determine which end cap 112 (and thus which ID chip) it is attached to; the label 110 reports back to the host 100 with the answer.

Another strategy is that set forth in the above-mentioned U.S. application No. Ser. 07/757,675, in which a label 110 that emits a message to be received by the host 100 also prompts one of the end caps 112 (i.e. the end cap to which it is attached) to emit an additional message which may be said to be "appended" to the label's message. In this embodiment the end cap 112 is called an "appender" since it appends messages to the messages emitted by the labels 110 attached to it. Using either of the above-referenced techniques the host 100 is able to build up and maintain a database which keeps track of the rail 106 on which each label 110 is located.

The above-mentioned techniques for determining the location of a label 110 permit localizing the label 110 to a rail 106, but give no information about the precise lateral position of label 110 on the rail 106. If system requirements call for such information it may be obtained by the techniques set forth in U.S. application Ser. No. 08/031,580 entitled Technique for locating labels in an electronic price display system now U.S. Pat. No. 5,374,815, and application Ser. No. 08/207,956, entitled Technique for locating electronic labels in an electronic price display system, incorporated herein by reference. Briefly, a characteristic of the rail 106 is varied along its length. One way to do this is with an optically patterned strip. An optical reader on the back of the label 110 reads the pattern to which the label 110 is juxtaposed given its particular position on the rail. The pattern is communicated from the label 110 to the host 100 and permits the host 100 to know with considerable precision the location of the label 110.

Figure 2:
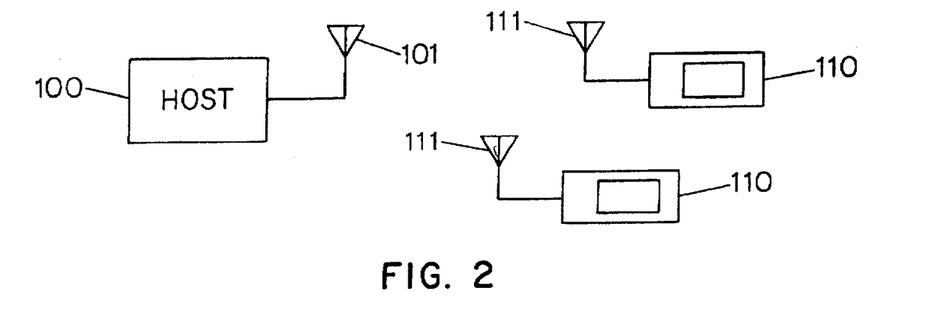
FIG. 2 shows another hardware configuration for the system according to the invention.

FIG. 2 shows another hardware configuration for the host 100 and labels 110. In this configuration the labels 110 each have an antenna 111 which permits bidirectional communication via radio frequencies. The host 100 communicates with the labels 110 via an antenna system which is symbolized here by an antenna 101 but which may in actuality comprise a number of antennas distributed over the geographical area of the store. In this configuration each label 110 is powered by electrochemical storage (e.g. a lithium cell) or by photoelectric cells backed by a relatively low-leakage capacitor. The protocols for interaction between the host 100 and the labels 110 may be based upon that set forth in the above-mentioned U.S. application Ser. No. 07/995, 048. It will be appreciated that in the arrangement of FIG. 2 one saves the cost and effort of wiring a store with rails such as shown in FIG. 1, but one faces the prospect of having to worry a lot about the power available to each label and the quite limited energy budget that has to be imposed to permit the labels 110 to work on the limited energy available.

In the system of FIG. 2 it is assumed that the rail 106 is not electrically active, but merely serves as a physical holder for the labels 110. In such a system there are no end caps 112 of the type shown in FIG. 1, and thus the physical location of the label 110 on the rail 106 cannot be determined by the ID chip techniques discussed above. What can be used is the system in which the label 110 senses a physical rail characteristic such as the optical pattern mentioned above. In such a system the label 110 transmits the detected rail information (e.g. the optical pattern) to the host 100. Preferably the rail pattern has enough information content to permit uniquely determining the location of the label 110 to any particular location anywhere in the store; this means the pattern on the rails 106 does not repeat itself within the store.

Figure 3:
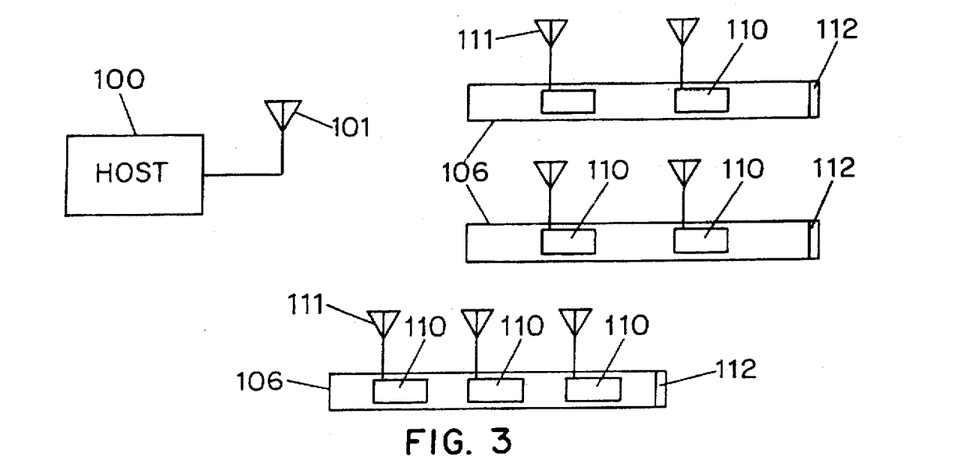
FIG. 3 shows yet another physical arrangement for an electronic shelf label system.

FIG. 3 shows yet another physical arrangement for an electronic shelf label system. In this arrangement the rails 106 contain conductors along their lengths, but the rails 106 are not connected electrically to each other. The labels 110 each have an antenna 111 for communication with the host 100. In addition, the labels 110 are able to interact with their associated end caps 112. The benefit is that each end cap 112 contains an ID chip with a unique address, so that each label 110 is able to determine which rail 106 it is attached to. This information may then be transmitted back to the host 100 and used to keep track of label locations.

To elaborate on the subglobal addressing technique according to the invention it is helpful first to review the prior art techniques for addressing electronic price display labels.

Figure 7:
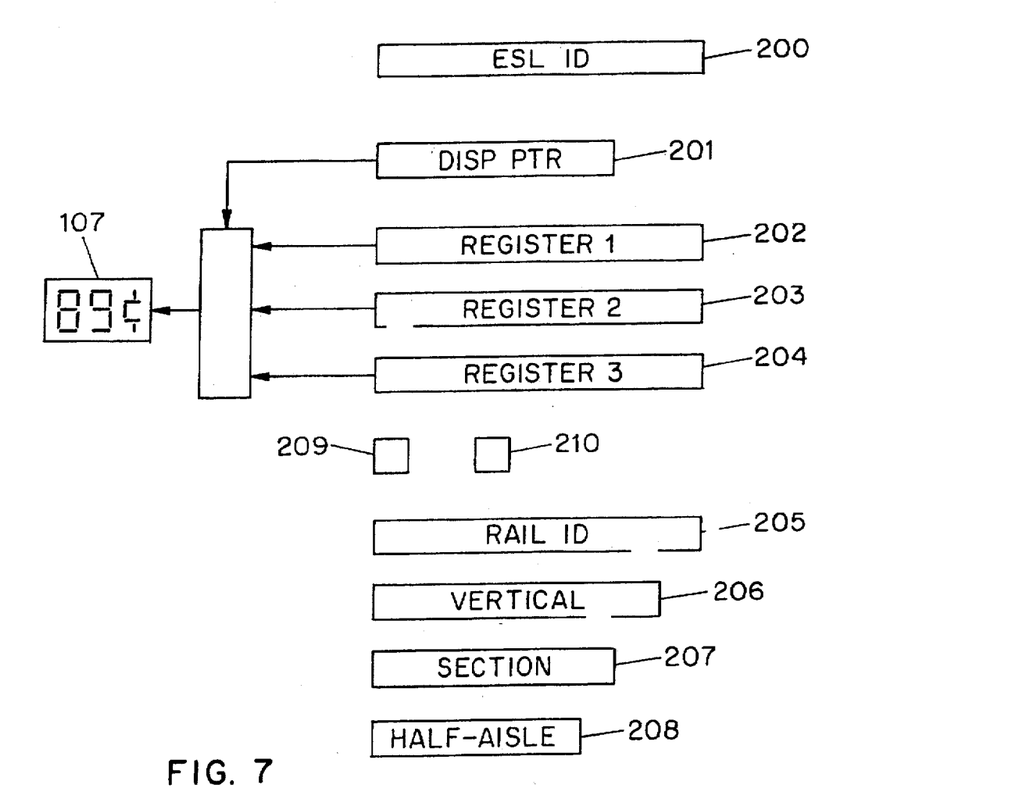
FIG. 7 shows some of the registers of a label according to the invention.

Unique addressing. One way to address electronic price display labels is by unique addressing. Each label contains an address, and addresses are set to be unique within a store. In FIG. 7, which shows some of the registers of a label according to the invention, the unique address is called the electronic shelf label identifier, or ESL ID 200. In a typical protocol the host 100 emits a message that contains a unique address and other information such as a command and data. Typically the communications bus is asynchronous, so that the message begins with a start bit. All of the ESLs 110 detect the start bit and receive most or all of the message. Each ESL compares the address in the message with its own ESL ID 200, and in general there is no match between the two; the label 110 returns to a state in which it is not receiving data. In the case where there is a match the label decodes the command and executes it, acting upon the data present in the message. Ideally the system is closed-loop; the label 110 emits a response and the response contains its unique address. The host 100 watches for the response and takes corrective action if no response is received.

The unique addresses may be burned into the labels upon manufacture or may be loaded into the nonvolatile memory of the labels after manufacture.

UPC addressing. One investigator has proposed programming each label with the UPC (uniform product code) of the item of merchandise with which it is associated. This is seen, for example, in the above-mentioned U.S. Pat. No. 4,500,880 to Gomersall. That investigator proposes that the UPC then be used to address the label. One drawback of this technique is that a particular item of merchandise may appear in the store in more than one location, or that the number of facings of a product may be so great as to call for more than one label among the facings. This leads to numerous logistical difficulties. One approach is to add one or more digits of suffix address to the UPC to identify the first, second, etc. instances of the UPC in the store. A complete label address is thus the UPC plus the ambiguity-eliminating suffix. This has the drawback that one must follow detailed protocols when a label bearing a suffix is taken out of service or is placed into service; records must be kept of the suffixes in use for a particular UPC value and the records must be of high reliability. Yet another possible drawback in some systems is that the UPC and suffixes represents an address space that is far larger than that which would be minimally necessary to give each label a unique address. Communications bus bandwidth gets consumed carrying address bits that could be eliminated if a more compact address were used.

Another approach is to use only the UPC as the address and to abandon any attempt at resolving ambiguities. In this case all communications with labels has to be open-loop (i.e. no response by labels) since if there were to be a response all labels with a given UPC would respond, and the responses would collide. SKU addressing. In many store chains management will set up a system of stock-keeping unit numbers (SKUs) that is distinct from the system of UPC code numbers. This permits a variant of the UPC addressing scheme, in which one stores in each label the stock-keeping unit (SKU) of the item of merchandise with which it is associated. The number of digits in an SKU is smaller than in a UPC; this is one reason many retailers use SKUs. But there is still the difficulty that a particular SKU may appear in more than one label in a store, or that the number of facings may call for more than one label for that SKU. This leads to some of the same problems as with UPCs—either the system is open-loop (no label responses) or ambiguity-eliminating digits have to be added to the address to uniquely specify each label. And the ambiguity-eliminating digits have to be administered in detail.

Global addressing. The other extreme in addressing is a global address. As set forth in the above-mentioned application Ser. No. 07/757,675, the address field could be filled with an address that is defined as a "global address", such as all zeros or all ones. Such an address, when received by a label, prompts a label to inspect the remainder of the message to determine whether or not it is supposed to take action. As an example of global addressing, consider a flag within each label that is nearly always in one state (e.g. "off") but that is occasionally on. The global message, defined by the manner in which the labels are programmed to behave, could mean "the label should respond, regardless of its absolute address, if its flag is on". In a simple case the flag gets set if a label is removed from the rail (and thus loses electric power) and is then reattached to the rail. The host 100 emits global queries frequently and (because most labels remain attached to rails most of the time) generally receives no answer to the global query; no label has lost power and regained it since the last time a global query was made. In this way the host 100 learns if a label 110 has been snapped into place on the rail 106, because the label 100 responds to the global query. Other uses of the powerful global inquiry concept are set forth in the above-mentioned application Ser. No. 07/757,675.

If the above discussion is kept in mind the register array of FIG. 7 may be discussed. FIG. 7 shows some of the internal registers of the label 110. Register 200 contains the ESL ID which is used in unique addressing as discussed above. A message received by a label 110 from the host 100 contains an address, and if the message address matches the ESL ID 200 then the label 110 acts upon the remainder of the message.

Registers 209 and 210 are status flags. For example, register 209 may be the power-on read status flag mentioned above in connection with global addressing. If a received message is a global message, then each label 110 checks the message to determine which of its status flags 209, 210 is applicable. If a particular label 110 determines that its applicable status flag is set, then it acts upon the received message. For example, flag 209 may be the flag that gets set when a label is powered on (i.e. the power status flag). If the global query is the power status query, then each label checks to see if its flag 209 is set; if so then the label responds.

The status flag can reflect nearly any event of interest to the host and not under control of the host, including, for example, a bib status signal as described in copending U.S. application Ser. No. 08/201,470 filed Feb. 24, 1994, and entitled Shelf Talker Management System, incorporated herein by reference.

Also shown in FIG. 7 are display registers 202, 203, 204, each of which may be changed by the host 100 by sending to the label 110 a specific message to change that register. A pointer register 201, also settable by the host 100 by sending an associated message, determines which of the registers 202, 203, 204 will determine the message appearing on the screen 107. This portrayal of the registers controlling the display is simplified for clarity; in reality the number of registers and the flexibility of their use is much greater, as set forth in the above-referenced application Ser. No. 07/995,048.

In accordance with the invention, there is defined within each label 110 one or more additional registers used for subglobal addressing. Depending on system requirements the additional registers may include a rail ID register 205, preferably sixteen bits in length; a vertical register 206 of about twelve bits; a section register 207 of about eight bits; and a half-aisle register 208 of about six bits.

As will be described in more detail below, in accordance with the invention the repertoire of defined messages between host 100 and label 110 includes not only unique-addressed and globally-addressed messages, but also subglobal addresses. For example, the message received by a label 110 may indicate that it is subglobal with reference to the rail ID register 205. In this case, the label would inspect the rail ID in the received message to see if it matches the contents of the label's own register 205. Generally there would be no match and no further action would be taken by the label 110. But if there is a match, then the label 110 acts on the message. Actions may include, for example, loading a value into the display pointer 201. Those skilled in the art will appreciate that this will cause all the labels 110 on a particular label 106 to change their displays essentially simultaneously.

The subglobal protocol may be applied to any of the registers 205, 206, 207, 208. If the half-aisle register 208 is used in the subglobal message, those skilled in the art will appreciate that all the labels 110 in an entire half aisle of the store can be made to change their displays essentially simultaneously.

As described in the above-referenced application Ser. No. 07/995,048, the internal structure of the label 110 can be such that a sequence of messages appears on the display 107. The sequence is defined by one or more sequence registers that determine the registers (e.g. 202, 203, 204) the contents of which then determine what is displayed.

According to the invention, the subglobal addressing technique may thus be applied not only to modification of the contents of a register 202, 203, or 204, or modification of a pointer register 201, but also to modification of sequence registers. Indeed the subglobal addressing can helpfully apply to any other new or existing appropriate command.

In the discussion thus far it is assumed that when a label 110 receives a subglobal message, it determines whether or not to respond based solely on the contents of the subglobal value (e.g. rail ID 205 or vertical 206) referred to in the message. The unique-address field, if present in the message, would be ignored, and no attempt would be made to compare it with the label's own ESL ID 200. On this assumption, all ESLs satisfying the condition would execute the command.

Figure 6:
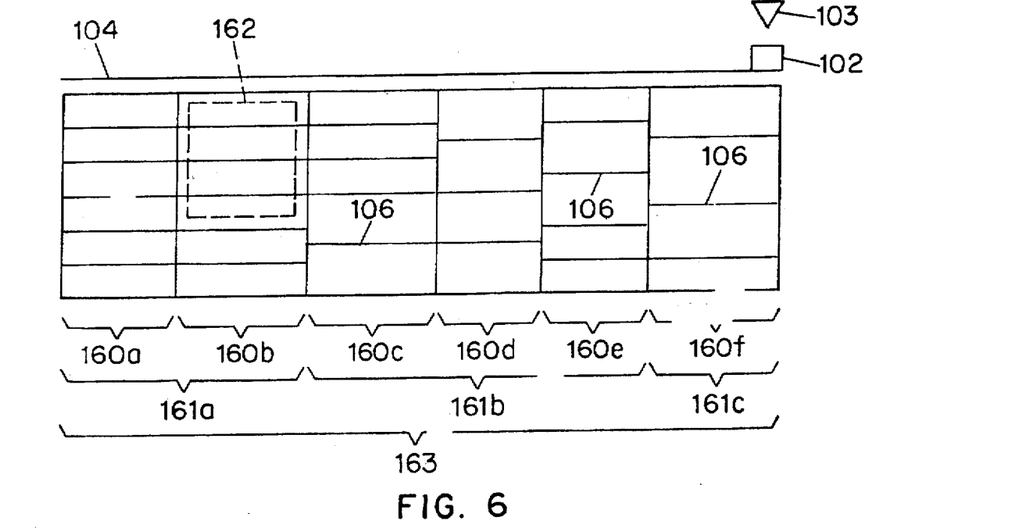
FIG. 6 illustrates some of the geographical relationships for which subglobal addressing may be desired.

FIG. 6 illustrates some of the geographical relationships for which subglobal addressing may be desired. Keeping in mind the structural elements of FIG. 1, a backbone 104 runs along the top of a gondola, connected with gondola controller 102 bearing antenna 103. Vertical rails 105, omitted for clarity in FIG. 6, connect the backbone 104 with rails 106. Each rail 106 has a unique rail ID, and if this rail ID is loaded into rail ID registers 205 (refer back to FIG. 7) then a subglobal message based on the rail ID permits addressing the labels 110 mounted on that rail 106.

FIG. 6 defines "verticals", namely the set of all rails 106 disposed vertically above and below each other. In FIG. 6 the verticals are 160a, 160b . . . 160f. The verticals are uniquely numbered within a store and the vertical numbers are stored in the register 206 of each label 110 (see FIG. 7). This permits addressing all the labels in a vertical.

A half-aisle 163 is also defined. As one looks down an aisle, this would refer to all the labels on the left side or all the labels on the right side. The half-aisles are uniquely numbered within a store and the half-aisle numbers are stored in the register 208 of each label 110 (see FIG. 7). This permits addressing all the labels in a half-aisle.

With reference to FIG. 7, a register 207 is allocated for "section". This register is programmed with a section within a store, which might be "Health And Beauty Aids" for example. A section would typically be a group of verticals, such as 161a in FIG. 6, or 161b or 161c. However the methodology set forth herein could apply to "section" as defined differently such as less than all of a vertical, such as the region 162 shown in dotted lines.

From the above discussion it will be appreciated that in general the ESL ID is purely a logical address, conveying nothing about the physical location of the ESL. ESL IDs are defined to be unique in the relevant address space. In contrast the subglobal addresses are intended to convey very specific information about the physical location of an ESL. In general it is expected that subglobal addresses are not unique: that any particular subglobal address will be found in more than one ESL. Thus, when a message tied to a subglobal address is emitted by the host it is expected that more than one and less than all of the ESLs will act upon the message.

Figure 5A:
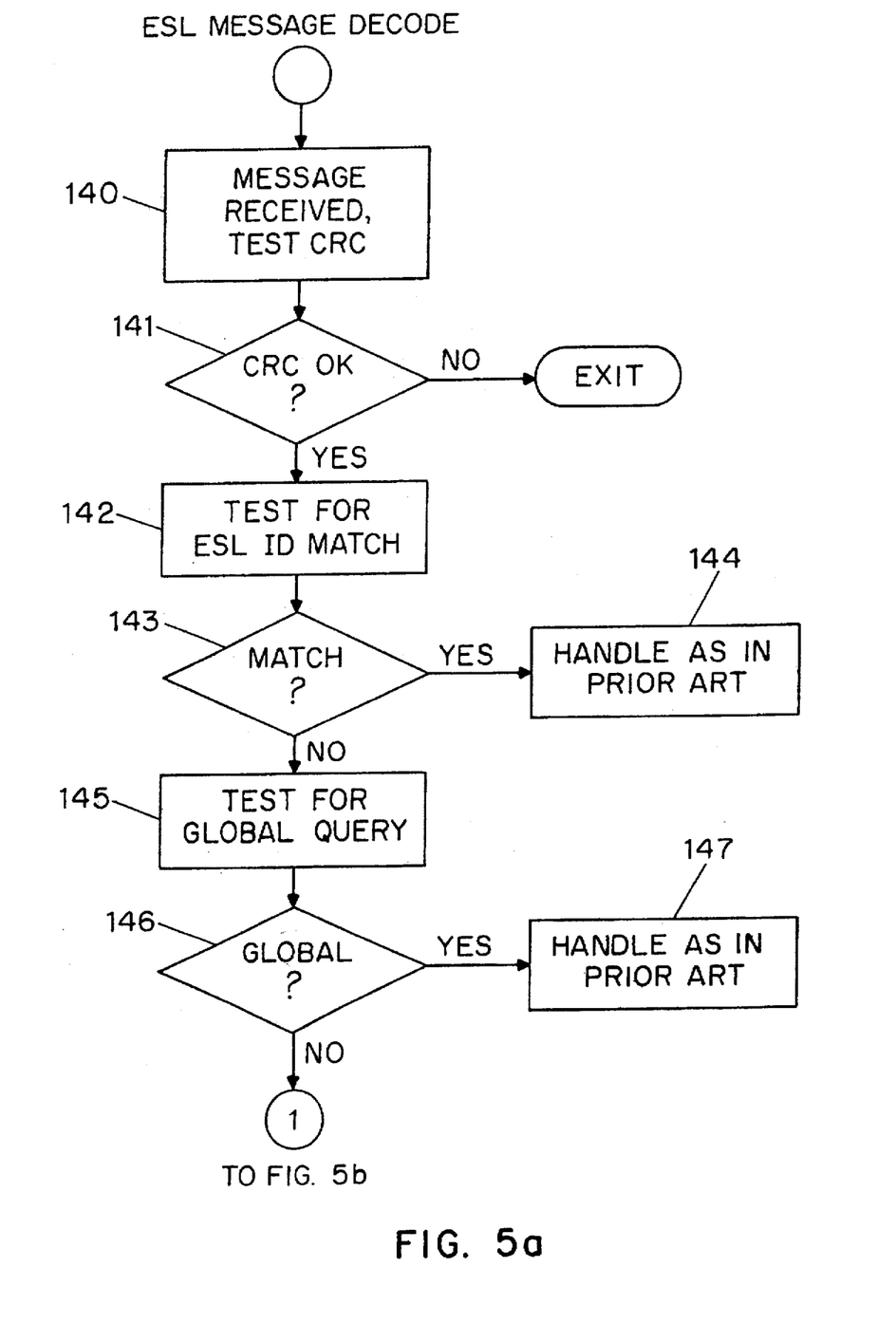
FIGS. 5a and 5b portray in flowchart form one way a label may handle received messages according to the invention.
Figure 5B:
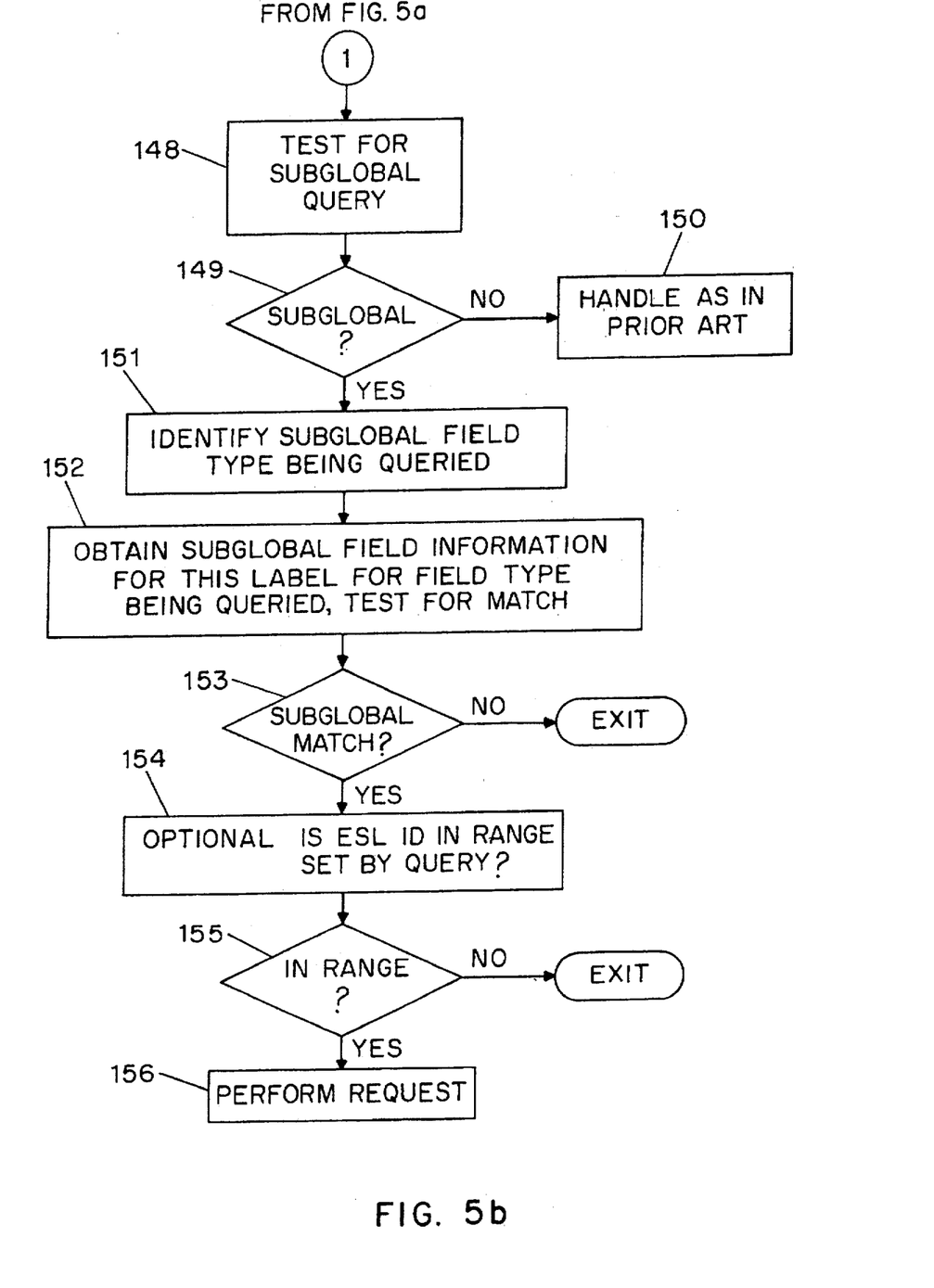

FIGS. 5a and 5b portray in flowchart form one way a label might handle received messages. At 140–141 the message is received and its CRC is checked to see if the message was received clearly. At 142–143 the label tests to see if it has been uniquely addressed, and if it has then the label handles the command. At 145–146 the label checks to see if the message is a global query such as the above-mentioned global power-status flag query; if so then the query is handled.

Up to this point in FIGS. 5a and 5b the label actions are of types previously described. In keeping with the invention, however, at boxes 148–149 a test is made to see if the message represents a subglobal query. If not, then the label proceeds as previously described, for example by concluding that an undefined command has been received. At 151 the label determines which subglobal field is being queried. The subglobal field contents in the message are then compared with the pertinent register within the label 110 (e.g. registers 205, 206, 207, or 208 in FIG. 7). If there is no match (tested in boxes 152–153) then no further action is taken.

If there is a match, then optionally a test is made (boxes 154–155) for a predetermined relationship between the ESL ID and the unique address in the message.

Then the request of the message is performed, as shown in box 156.

Those skilled in the art will appreciate that while the message decoding could be done in the sequence shown in the figures, nothing about the technology requires that sequence. For example, the flowchart shows the ESL address being decoded and matched first, while the portion of the message that determines whether the message is subglobal is being checked only later. This is a matter of design choice and other sequences do not depart from the invention. For example the label could check first to see which addressing scheme (unique, subglobal, global) is being used and then act only on that scheme, perhaps never bothering to compare the ESL ID with anything in the message. This design choice might be made one way to minimize the amount of memory required to store the software for the decoding, or might be made a different way to minimize the execution time averaged across all messages (to minimize power consumption, for example).

Those skilled in the art will also appreciate that without departing from the invention one could eliminate portions of FIGS. 5a and 5b. For example, if only one subglobal field were used rather than the several fields discussed herein, box 151 could be eliminated.

As was mentioned above in the Background, in a wireless electronic price display system the designer is necessarily concerned with the limited energy budget due to power being supplied by batteries and/or photoelectric cells. Power consumption in an LCD-type electronic shelf label varies depending on what the label is doing at the time. When a label is transmitting RF it is consuming a fairly substantial power level in the RF transmitter, typically in the milliwatts. By comparison the LCD display draws very little power, typically in the microwatts. The remaining area of power consumption is the processor which is typically a CMOS processor, in which power consumption does not depend very much on what the processor is doing but depends mostly on the clock speed of the processor. As a result power management is often implemented to slow down the processor clock speed during times when the processor need not be active, namely when the display is not changing and when the label is neither receiving nor transmitting data. Stated differently, however, the processor has to be active whenever the host is transmitting a message, for the simple reason that a particular message might be for any one of the labels. Thus each of the labels must receive the message and at a minimum must calculate the CRC and decode enough of the message to determine whether the message is for that label.

It will thus be appreciated that in a system employing power management the power consumption is strongly influenced by the fraction of the time that the host is transmitting. In a battery-powered system that fraction may be the largest determinant of the battery life. In a photoelectric-powered system the ambient light level may place an upper bound on the permitted level of host transmission activity.

Figure 8:
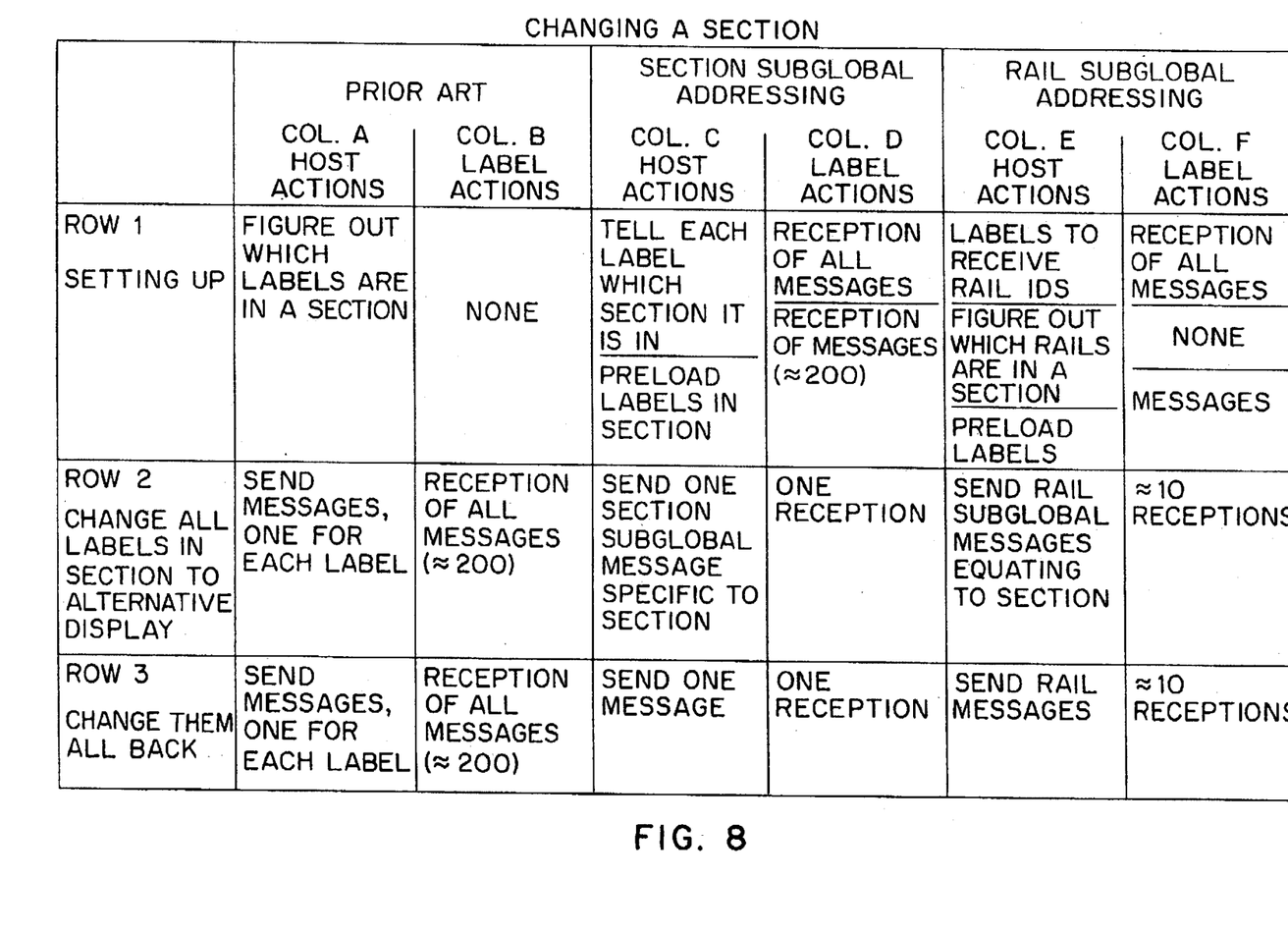
FIG. 8 shows, in tabular form, some of the factors that motivate subglobal addressing by sections or by rails as distinguished from addressing as performed in the prior art.

Bearing these factors in mind, one may consider FIG. 8 which shows, in tabular form, some of the factors that motivate subglobal addressing by sections or by rails as distinguished from addressing as performed in systems previously described. What is compared is the effort required to change all of the labels in a section of the store from a long-term display to an alternative display, and back again. The effort required to change the labels from a long-term (normal) display to an alternative display is detailed in row 2, while the effort to change back to the normal display is detailed in row 3. The first two columns portray the effort in a prior-art system, while the remaining four columns characterize the system according to the invention. Columns C and D show display changes where the subglobal addressing is by section (i.e. register 207 in FIG. 7) while columns E and F show display changes where the subglobal addressing is by rail ID (i.e. register 205 in FIG. 7).

Referring first to columns A and B, consider what has to take place in a prior-art system for all the labels in a section (e.g. HABA) to change displays. First, the host (box 1A) has to have established a data file setting forth the unique label IDs of the labels in each section including the section for which the change is desired. Most of the effort expended to create and maintain this file is on the part of the host, which draws power from the AC line so that power consumption is not of great concern. To the extent that label activity is required to build up and maintain this file the activity is considered to be more like a nonrecurring energy cost than a recurring one.

Moving downward to boxes 2A and 2B, the effort required to change all the displays in the section is portrayed. Messages are sent to each of the labels in the section, and the message can contain the desired alternative information. (As set forth in U.S. application Ser. No. 07/757,675, the alternative information can be any of a variety of things including a special sale price or the amount of inventory present in the store.) As a matter of terminology it is commonplace to refer to a message "sent to" a particular label but it should be appreciated that in a very real sense all the labels (everywhere in the store) receive the message, if for no other purpose than to discard it upon determining that no action is required. The message may be a register-load command which changes the contents of a display memory (e.g. register 202 in FIG. 7), or that changes a pointer (e.g. register 201 in FIG. 7), or a combination of such messages.

Finally in boxes 3A and 3B the effort required to restore the displays to their previous, "normal" settings is portrayed. Each label receives a message addressed to it individually, with the command to return to the normal setting. As with row 2, it will be appreciated that this may be a register-load command which changes the contents of a display memory (e.g. register 202 in FIG. 7), or that changes a pointer (e.g. register 201 in FIG. 7), or some combination thereof.

It will be appreciated that the energy expended in the labels is proportional to the number of messages handled in column B, here estimated at 400 messages for an exemplary section.

Turning now to columns C and D, consider first boxes 2C and 2D. For all the labels in a section to switch to an alternative display all that is required is the transmission of one message, namely a subglobal message specific to the section. As shown in boxes 3C and 3D a second message is required to switch all the labels back.

It's not as simple as that, of course; it would be too good to be true if a mere two messages accomplished the entire switch and switch back. As disclosed in boxes 1C and 1D, it is necessary that the host maintain a file listing the labels in each section. As with the prior-art situation of columns A and B, the establishment and maintenance of this file is more of a nonrecurring task than a recurring task. It is also necessary that each label be told what its section subglobal address is (e.g. register 207, FIG. 7). It is also necessary that the labels in the section of interest be preloaded with the desired alternative information. For example, the preloaded information could be placed in one of the registers 202, 203, or 204 that is not presently in use. This results, on the estimate used in this figure of 200 labels in the section, on the transmission of 200 uniquely addressed messages (box 1D).

Columns E and F show the message burden in the case where subglobal addressing by rail ID is employed. The setup, shown in boxes 1E and 1F, requires that the host maintain information on the rail IDs located in each section. It also requires that each label be told what its rail ID is. It is also necessary that the labels in the section of interest be preloaded with the desired alternative information. For example, as discussed above the preloaded information could be placed in one of the registers 202, 203, or 204 that is not presently in use. This results, on the estimate used in this figure of 200 labels in the section, on the transmission of 200 uniquely addressed messages (box 1D).

Boxes 2E, 2F, 3E, and 3F show the message transmissions needed to make the section's displays change. Basically the host sends as many messages as there are rail IDs in the section. (Here the number of rail IDs in the section is estimated at ten.) A comparable number of messages restores the displays to normal.

As was discussed above, desirably the function of the end caps 112 is that ID chips located therein will append messages to those generated by the ESLs. Each appended message conveys the unique address of the particular rail 106 to which the end cap 112 is attached. In the system set forth in the above-mentioned U.S. application Ser. No. 07/757,675, the only entity paying attention to the appended message is the host, which uses the content of the appended message to determine which rail a particular label is on. Once the host 100 determines the rail ID of the rail to which a particular label 110 is attached, the host 100 could send a message to that label 110 updating the contents of the rail ID register 205 (FIG. 7).

Figure 4:
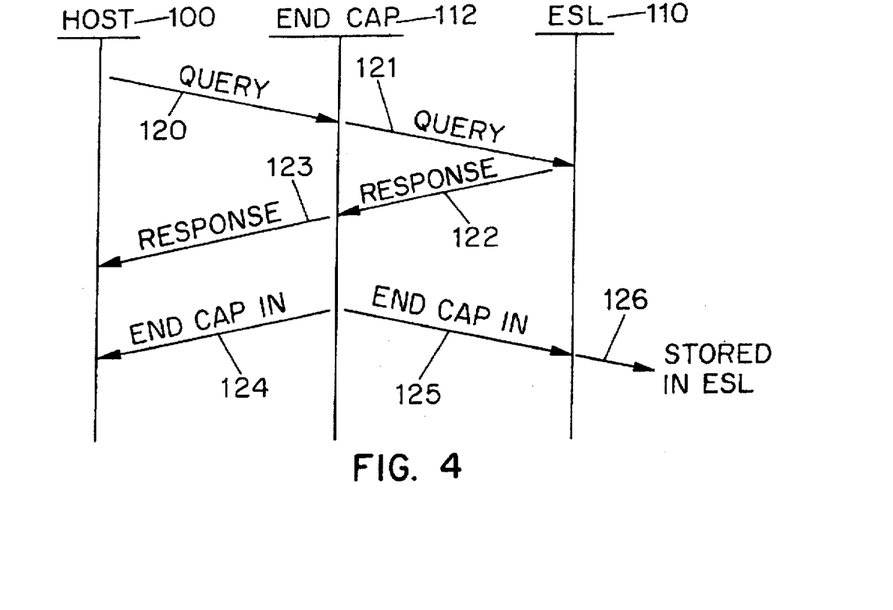
FIG. 4 shows in data flow form a way of loading a label with a rail ID.

As is set forth in FIG. 4, however, it is desirable to program the label 110 so that under certain circumstances it will monitor the appended message from the end cap 112 and store that value in its register 205 (FIG. 7). This saves having to use a bus message for the host 100 to inform the label 110 of its rail ID number. A command is defined in which the host 100 directs a particular label to respond, thus triggering an appended message, followed by the particular label monitoring the appended message and storing the rail ID in the label.

Yet another command may optionally be defined which prompts a label to compare the rail ID extracted from an appended message with the rail ID already stored in the label; if a difference is detected then the label annunciates the detection of the difference.

Figure 9:
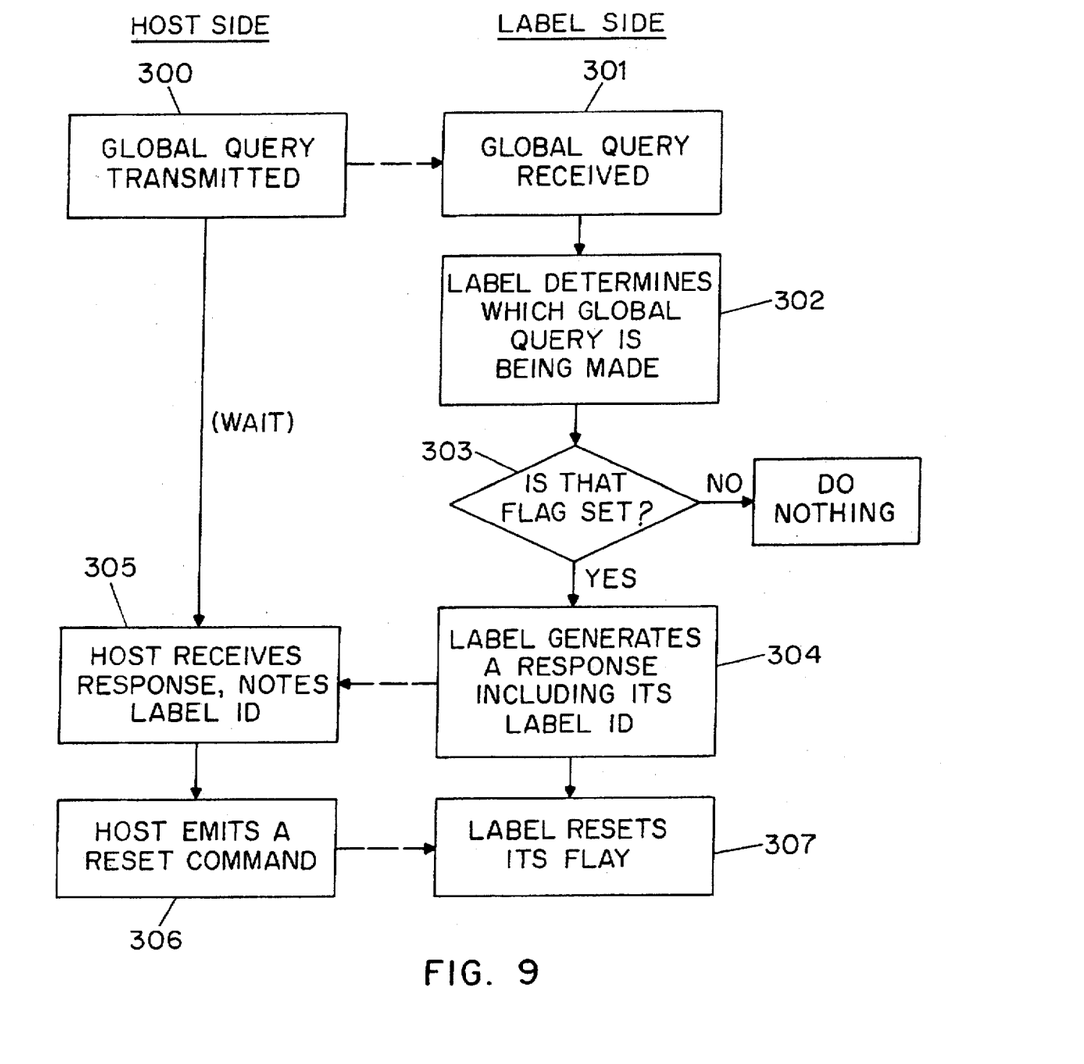
FIG. 9 shows a typical sequence of events in a global status flag query.

Returning now to FIG. 7, it will be recalled that flags 209 and 210 depict flags used in global read-status queries as set forth in the aforementioned application Ser. No. 07/757,675. FIG. 9 shows a typical sequence of events in such a query, from the point of view of the host 100 and the point of view of one of the electronic shelf labels 110. At box 300 the host emits a global query. All of the labels receive the query, and while it is assumed that generally none of the labels would respond (since the condition of the global query is generally not true for any of the labels) for this example it is assumed that one label will respond, as shown in boxes 301, 302, 303, and 304. The response includes the unique label ID of the responding label. The host (at box 305) receives the response, notes the label ID, and (at box 306) emits a reset command, telling the label to reset its flag (box 307).

If, for example, the flag prompting the label's response was flag 210 in FIG. 7, then the resetting action of box 307 (FIG. 9) is the resetting of the flag 210.

Not shown in FIG. 9 is the later action taken by the host due to the response of a label to the global query. For example, if the global query revealed a label that has just been powered up, the host will take various steps to determine whether the label should already have been powered up and whether the recent power-up event might represent a label that has been moved from its previous location.

The sequence of events in FIG. 9 assumes that the global queries are performed often enough to reduce to a minimum the likelihood of two labels responding to the query. In accordance with the invention, however, subglobal addressing may be used to overcome the difficulty of two or more labels responding at the same time. This is shown in the flowchart of FIG. 10.

Figure 10:
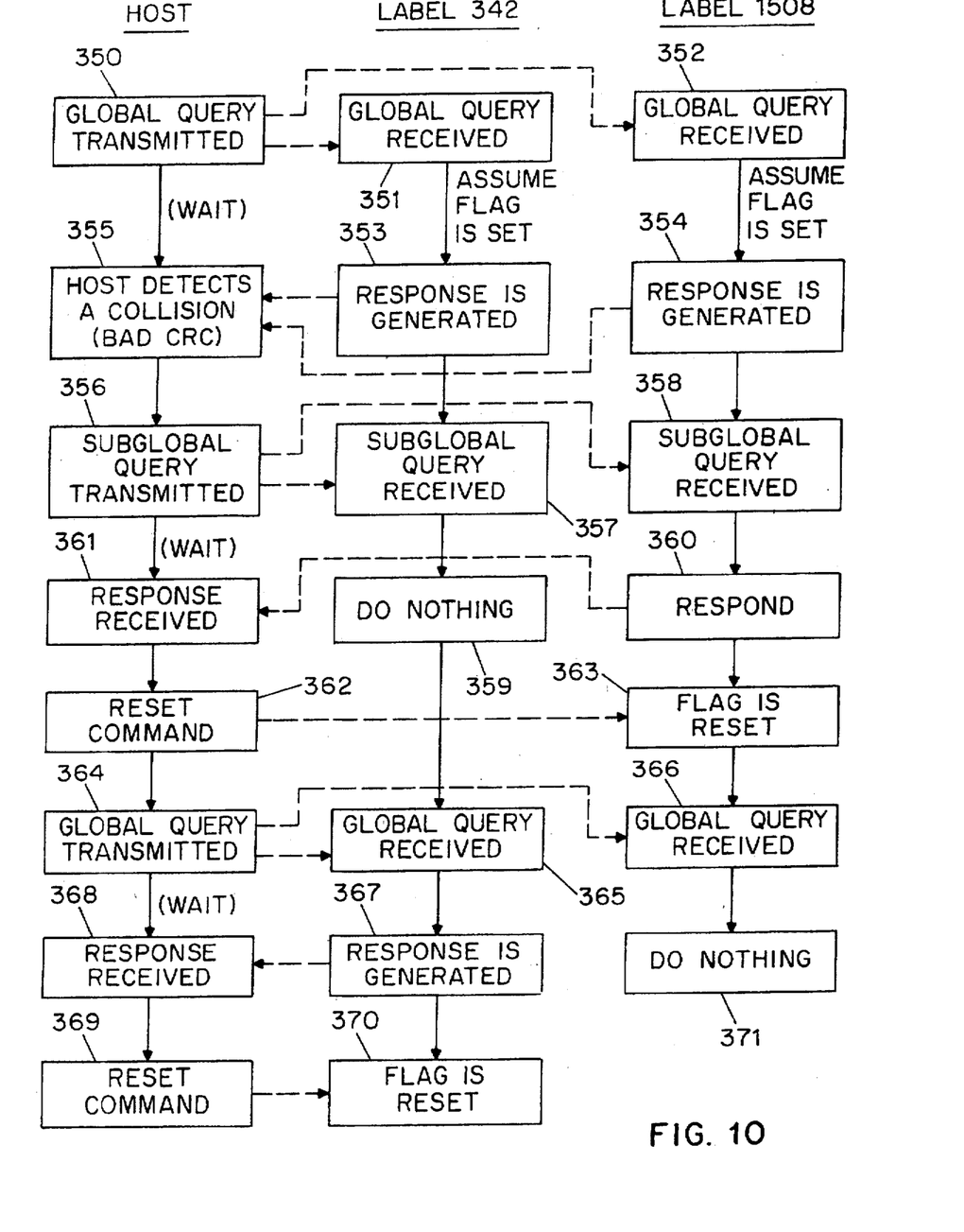
FIG. 10 shows a typical sequence of events in a subglobal status flag query.

In FIG. 10 there are three vertical paths. The first portrays the actions of the host as in the first column of FIG. 9. The second and third columns portray the actions of two arbitrary labels with arbitrary unique addresses.

First the host (box 350) transmits a global query. The query is received by all labels including the labels with unique addresses 342 and 1508 shown in the second and third columns (boxes 351, 352). For sake of discussion it is assumed that both of these labels have their flags set, and so will respond to the global query (boxes 353, 354). The responses collide on the communications channel and at box 355 the host finds a CRC error—each message has been garbled. Box 355 corresponds to box 305 in FIG. 9; in FIG. 9 (box 305) only one label responded and the response was clearly received, while in FIG. 10 (box 355) two labels responded and no message was clearly received.

According to the invention, at box 356 a subglobal query is issued with respect to the same flag that was being tested in the global query of box 350. The protocol defining interactions between the host and the labels is such that the host specifies the flag to be tested and also specifies less than all of the address space of unique label IDs. Typically a most significant or least significant nybble (four bytes) is specified to match that of the label or labels responding.

In the example of FIG. 10 the subglobal query reaches the two labels whose flags are set (the labels of the second and third columns) in boxes 357 and 358. For sake of discussion it is assumed that the nybble specified in the subglobal query has a value that permits the label of the third column to respond, but masks out the label of the second column. At box 360, under this assumption, then there is a response by that label. Box 359 represents the fact that the label of the second column was masked due to the contents of the nybble specified in the subglobal query.

Continuing with FIG. 10, at box 261 the host receives the response of the label of the third column. The information in the response includes the unique ID of the label. The host then makes note of the label ID and resets the label at boxes 362 and 363, in a way that corresponds to boxes 306 and 307 (FIG. 9). The label of the third column will no longer respond to global or subglobal queries with respect to this flag, as shown in box 366 and 371.

At box 364 the host transmits another global query, and the label of the second column (which still has its flag set) receives the query (in box 365) and responds in box 367. The response is received by the host in box 368, and in this example there are no collisions because only one label is responding. The host resets that particular label in box 369 and 370, and notes the event for further processing.

Those skilled in the art will appreciate that the sequence of events set forth in FIG. 10 will not always work out. For example, if there are more than two labels with associated flags set, then there will still be a collision at box 361 or 368 or both. Another way things can go wrong is if the particular nybble value in the subglobal query of box 356 does not separate the colliding labels. In any of these cases the host can simply specify larger and larger portions of the label ID (two nybbles, three, nybbles, etc.) until eventually collisions are avoided. The result is that an unambiguous label ID is received sooner or later, and that label is reset. (And, of course, note is made of the label ID for later corrective action.) The number of colliding labels has now been reduced by one, and the disambiguation process is repeated assuming there are still collisions taking place when the global query is again attempted.

There has thus been described herein a system according to the invention in which subglobal addressing offers many benefits, not the least of which is the ability to conserve power in a power-limited electronic price display system.

Thus, while many of the examples given above have been described with respect to a wired communications channel between the host and the labels, mediated by gondola controllers and appenders, numerous other embodiments are possible that do not in any way depart from the invention. As mentioned earlier, it is possible to have a wired system where the communications channel is direct from the host to the labels, not mediated by gondola controllers or appenders, that accomplishes many of the desirable features of the invention. And as was also mentioned earlier, it is possible to have an RF-linked or infrared-linked system that accomplishes many of the desirable features of the invention. The invention should not be construed as limited to any one communications medium (e.g. wired or RF or IR) but should be understood as offering its benefits in any of several different media.

The invention has been described with respect to an asynchronous communications bus, where each communications interval begins with a start bit relative to a previous idle period. Those skilled in the art will appreciate, however, that the system could equally well be run with a synchronous communications bus, for example with a clock signal communicated separate from and in addition to the data signal.

The invention should not be construed, then, as limited to the particular embodiments set forth above, but should be construed as set forth in the claims that follow.

I claim:

1. A method of addressing more than one and less than all of the display devices in an electronic display system, said system comprising a host and a multiplicity of electronic price display devices communicatively coupled with the host, each display device having a respective unique address and responsive to messages from the host containing said unique address, said method comprising the steps of:

selecting a first particular subglobal address value;

storing to substantially all of the display devices respective subglobal address values such that the particular subglobal address value is stored to more than one and less than all of the display devices;

broadcasting to the display devices a command comprising:

an indication that the command is to be addressed with respect to each display device's respective subglobal address; and a second particular subglobal address value;

within each display device, comparing the second particular subglobal address value with the display device's respective stored subglobal address value, and performing a predetermined action if the second particular subglobal address value bears a predetermined relation to the display device's respective stored subglobal address value.

2. The method of claim 1 wherein each display device comprises first and second registers selectively coupled to a display and determining what appears on the display, wherein the predetermined action comprises changing which of the first and second registers is coupled to the display.

3. The method of claim 1 wherein each display device comprises a display and a pointer determining which of two sequences will appear on the display, and wherein the predetermined action comprises modifying the pointer, thereby changing which of the sequences is being displayed.

4. The method of claim 1 wherein each display device comprises a first register coupled to a display and determining what appears on the display, and wherein the command further comprises data indicative of desired contents for the first register, and wherein the predetermined action comprises writing the data to the first register.

5. The method of claim 1 wherein each display device comprises a plurality of registers selectively coupled to a display and determining what appears on the display, and wherein the command further comprises data indicative of one of the plurality of registers and data indicative of desired contents for the one of the plurality of registers, and wherein the predetermined action comprises writing the data to the indicated register.

6. The method of claim 1 wherein the display devices are in a physical space, and wherein the storing step further comprises partitioning the physical space into subspaces, assigning respective subglobal addresses to the subspaces, and storing to each display device the subglobal address of the subspace in which the display device is located.

7. The method of claim 6 wherein the subspace comprises a half-aisle.

8. The method of claim 7 wherein the subglobal addresses are defined to have a size in the range of 6 to 8 bits.

9. The method of claim 6 wherein the subspace comprises a rail, the subglobal address defining a rail-id.

10. The method of claim 9 wherein the rail-ids are defined to be 16 bits in size.

11. The method of claim 6 wherein the subspace comprises a vertical.

12. The method of claim 11 wherein the subglobal addresses are defined to have a size in the range of 8 to 12 bits.

13. The method of claim 6 wherein the subspace comprises a section.

14. The method of claim 13 wherein the subglobal addresses are defined to be 8 bits in size.

15. An address-loading method for use in an electronic display system having a host with a first bus, a plurality of appenders communicatively coupled with the first bus, each appender having a respective unique address and having a respective second bus and communicatively coupling the first and second bus, and a multiplicity of display devices communicatively coupled with various of the second buses, each display device having a respective unique address and responding to messages from the host containing the respective address, each appender responsive to a response from a display device detected on its second bus for transmitting its own address subsequently thereto; the method comprising the steps of:

sending a message from the host to a particular one of the display devices;

sending a response from the particular one of the display devices;

transmitting, from the appender detecting the response, the address of the appender;

detecting, within the particular one of the display devices, the address transmitted by the appender; and storing, within the particular one of the display devices, the detected address.

16. The method of claim 15 wherein the display devices are physically located on rails, wherein each rail has a respective appender, and wherein the address of the appender defines a rail-id.

17. A method of addressing substantially all of the display devices on one particular rail in an electronic display system, said system having a host with a first bus, a plurality of appenders communicatively coupled with the first bus, each appender associated with a rail and having a respective unique address and having a respective second bus associated with the rail and communicatively coupling the first and second bus, and a multiplicity of display devices mounted on various of the rails, each display device having a respective unique address and responding to messages from the host containing the respective address, each appender responsive to a response from a display device detected on its second bus for transmitting its own address subsequently thereto; said method comprising the steps of:

for each particular one of substantially all of the display devices in the system, sending a message from the host to the particular one of the display devices; sending a response from the particular one of the display devices; transmitting, from the appender detecting the response, the address of the appender; detecting, within the particular one of the display devices, the address transmitted by the appender; and storing, within the particular one of the display devices, the detected address defining a subglobal address;

broadcasting to the display devices a command comprising:

an indication that the command is to be addressed with respect to each display device's respective subglobal address; and the unique address of the appender associated with the particular rail defining a second particular subglobal address value;

within each display device, comparing the second particular subglobal address value with the display device's respective stored subglobal address value, and performing a predetermined action if the second particular subglobal address value bears a predetermined relation to the display device's respective stored subglobal address value.

18. The method of claim 17 wherein each display device comprises first and second registers selectively coupled to a display and determining what appears on the display, and wherein the predetermined action comprises coupling the other of the first and second registers to the display.

19. The method of claim 17 wherein each display device comprises a display and a pointer determining which of two sequences will appear on the display, and wherein the predetermined action comprises modifying the pointer, thereby changing which of the sequences is being displayed.

20. The method of claim 17 wherein each display device comprises a first register coupled to a display and determining what appears on the display, and wherein the command further comprises data indicative of desired contents for the first register, and wherein the predetermined action comprises writing the data to the first register.

21. The method of claim 17 wherein each display device comprises a plurality of registers selectively coupled to a display and determining what appears on the display, and wherein the command further comprises data indicative of one of the plurality of registers and data indicative of desired contents for the one of the plurality of registers, and wherein the predetermined action comprises writing the data to the indicated register.

22. The method of claim 17 wherein the second subglobal address defines a rail-id.

23. The method of claim 22 wherein the rail-id is defined to be 16 bits in size.

24. A method of addressing substantially all of the display devices in a selected subspace of an electronic display system, said system having a host with a first bus, a plurality of appenders communicatively coupled with the first bus, each appender associated with a rail and having a respective unique address and having a respective second bus associated with the rail and communicatively coupling the first and second bus, and a multiplicity of display devices mounted on various of the rails, each display device having a respective unique address and responding to messages from the host containing the respective address, each appender responsive to a response from a display device detected on its second bus for transmitting its own address subsequently thereto; wherein the display devices are in a physical space; said method comprising the steps of:

for each particular one of substantially all of the display devices in the system, sending a message from the host to the particular one of the display devices; sending a response from the particular one of the display devices; transmitting, from the appender detecting the response, the address of the appender; detecting, within the particular one of the display devices, the address transmitted by the appender; and storing, within the particular one of the display devices, the detected address defining a subglobal address;

partitioning the physical space into subspaces;

compiling a list indicative of the addresses of the appenders associated with the rails located within the various subspaces;

for each particular one of the appender addresses listed for the selected subspace, broadcasting to the display devices a command comprising:

an indication that the command is to be addressed with respect to each display device's respective subglobal address; and the one of the particular appender addresses, said address defining a second particular subglobal address value;

within each display device, comparing the second particular subglobal address value with the display device's respective stored subglobal address value, and performing a predetermined action if the second particular subglobal address value bears a predetermined relation to the display device's respective stored subglobal address value.

25. The method of claim 24 wherein each display device comprises first and second registers selectively coupled to a display and determining what appears on the display, and wherein the predetermined action comprises coupling the other of the first and second registers to the display.

26. The method of claim 24 wherein each display device comprises a display and a pointer determining which of two sequences will appear on the display, and wherein the predetermined action comprises modifying the pointer, thereby changing which of the sequences is being displayed.

27. The method of claim 24 wherein each display device comprises a first register coupled to a display and determining what appears on the display, and wherein the command further comprises data indicative of desired contents for the first register, and wherein the predetermined action comprises writing the data to the first register.

28. The method of claim 24 wherein each display device comprises a plurality of registers selectively coupled to a display and determining what appears on the display, and wherein the command further comprises data indicative of one of the plurality of registers and data indicative of desired contents for the one of the plurality of registers, and wherein the predetermined action comprises writing the data to the indicated register.

29. The method of claim 24 wherein the second subglobal address defines a rail-id.

30. The method of claim 29 wherein the rail-id is defined to be 16 bits in size.

31. The method of claim 24 wherein the subspace comprises a half-aisle.

32. The method of claim 24 wherein the subspace comprises a vertical.

33. The method of claim 24 wherein the subspace comprises a section.

34. An electronic display system comprising:
   a host;
   a multiplicity of display devices, each having a unique address and responsive to a first message from the host containing the unique address for generating a second message in response thereto; and
   a communications channel communicatively coupling the host and the multiplicity of display devices;
   each display device further characterized in having a power-status status flag that is set upon power-up of the display device and that is cleared upon receipt of a third message from the host;
   each display device responsive to a fourth message from the host that does not contain its unique address with a fifth message in the event of the display device's power-status flag being set;
   each display device further characterized in being responsive to a sixth message from the host containing a portion of its unique address with a seventh message in the event of both the display device's power-status flag being set and the event of the portion in the sixth message matching the corresponding portion of its own address.

35. The system of claim 34 wherein the addresses are expressed in bits and the portion is a number of bits.

36. The system of claim 35 wherein the number of bits is a variable number, said variable number communicated in the sixth message.

37. An electronic display system comprising:
   a host;
   a multiplicity of display devices, each having a unique address and responsive to a first message from the host containing the unique address for generating a second message in response thereto; and
   a communications channel communicatively coupling the host and the multiplicity of display devices;
   each display device further characterized in having a button and a button-status flag that is set upon the pressing of the button and that is cleared upon receipt of a third message from the host;
   each display device responsive to a fourth message from the host that does not contain its unique address with a fifth message in the event of the display device's button-status flag being set;
   each display device further characterized in being responsive to a sixth message from the host containing a portion of its unique address with a seventh message in the event of both the display device's button-status flag being set and the event of the portion in the sixth message matching the corresponding portion of its own address.

38. The system of claim 37 wherein the addresses are expressed in bits and the portion is a number of bits.

39. The system of claim 38 wherein the number of bits is a variable number, said variable number communicated in the sixth message.

40. An electronic display system comprising:
   a host;
   a multiplicity of display devices, each having a unique address and responsive to a first message from the host containing the unique address for generating a second message in response thereto; and
   a communications channel communicatively coupling the host and the multiplicity of display devices;
   each display device further characterized in having a battery and a battery-status flag that is set upon the event of some level of battery loss;
   each display device responsive to a fourth message from the host that does not contain its unique address with a fifth message in the event of the display device's battery-status flag being set;
   each display device further characterized in being responsive to a sixth message from the host containing a portion of its unique address with a seventh message in the event of both the display device's battery-status flag being set and the event of the portion in the sixth message matching the corresponding portion of its own address.

41. The system of claim 40 wherein the addresses are expressed in bits and the portion is a number of bits.

42. The system of claim 41 wherein the number of bits is a variable number, said variable number communicated in the sixth message.

43. An electronic display system comprising:
   a host;
   a multiplicity of display devices, each having a unique address and responsive to a first message from the host containing the unique address for generating a second message in response thereto; and
   a communications channel communicatively coupling the host and the multiplicity of display devices;
   each display device further characterized in having a sensor sensing presence of a bib attached to the device and a bib-status flag that is set upon the event of the sensor sensing a change;
   each display device responsive to a fourth message from the host that does not contain its unique address with a fifth message in the event of the display device's bib-status flag being set;
   each display device further characterized in being responsive to a sixth message from the host containing a portion of its unique address with a seventh message in the event of both the display device's bib-status flag being set and the event of the portion in the sixth message matching the corresponding portion of its own address.

44. The system of claim 43 wherein the addresses are expressed in bits and the portion is a number of bits.

45. The system of claim 44 wherein the number of bits is a variable number, said variable number communicated in the sixth message.

46. An electronic display system comprising:
   a host;

a multiplicity of display devices, each having a unique address and responsive to a first message from the host containing the unique address for generating a second message in response thereto; and a communications channel communicatively coupling the host and the multiplicity of display devices;

each display device further characterized in having a flag that is set upon some event not controlled by the host;

each display device responsive to a fourth message from the host that does not contain its unique address with a fifth message in the event of the display device's flag being set;

each display device further characterized in being responsive to a sixth message from the host containing a portion of its unique address with a seventh message in the event of both the display device's flag being set and the event of the portion in the sixth message matching the corresponding portion of its own address.

47. The system of claim 46 wherein the addresses are expressed in bits and the portion is a number of bits.

48. The system of claim 47 wherein the number of bits is a variable number, said variable number communicated in the sixth message.

* * * * *